No. 678,707. Patented July 16, 1901.
E. WESTON.
ART OF MANUFACTURING MOVABLE COILS FOR USE IN CONNECTION WITH ELECTRICAL MEASURING INSTRUMENTS.
(Application filed Nov. 27, 1899.)
(No Model.) 3 Sheets—Sheet 1.
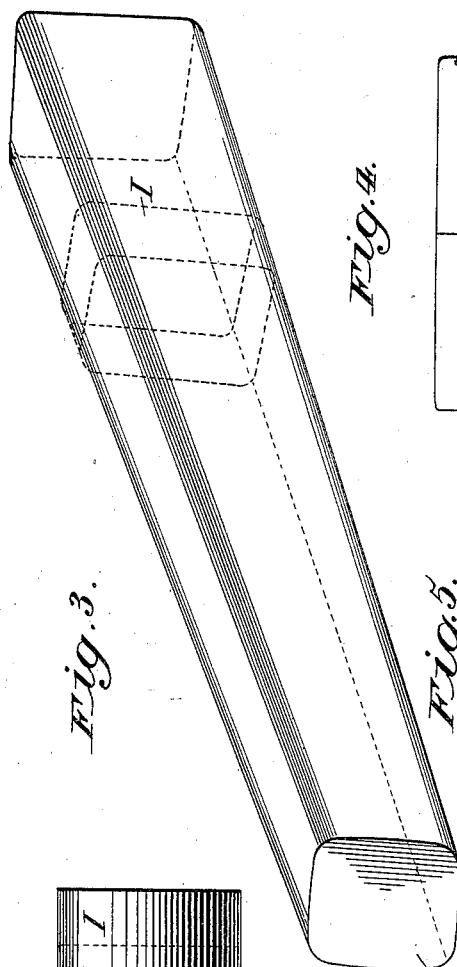
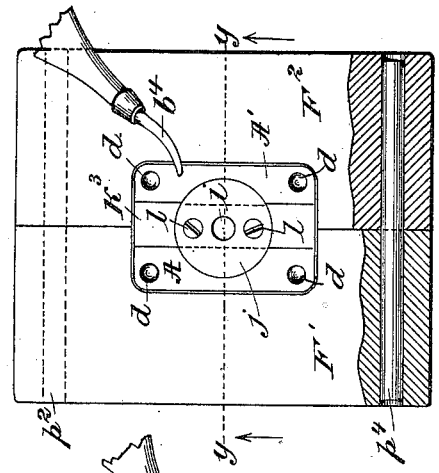
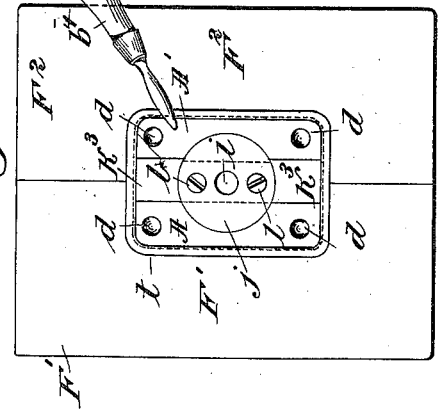
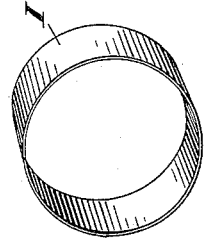
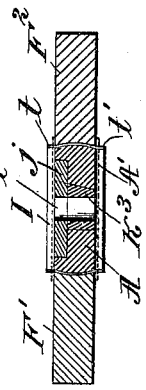

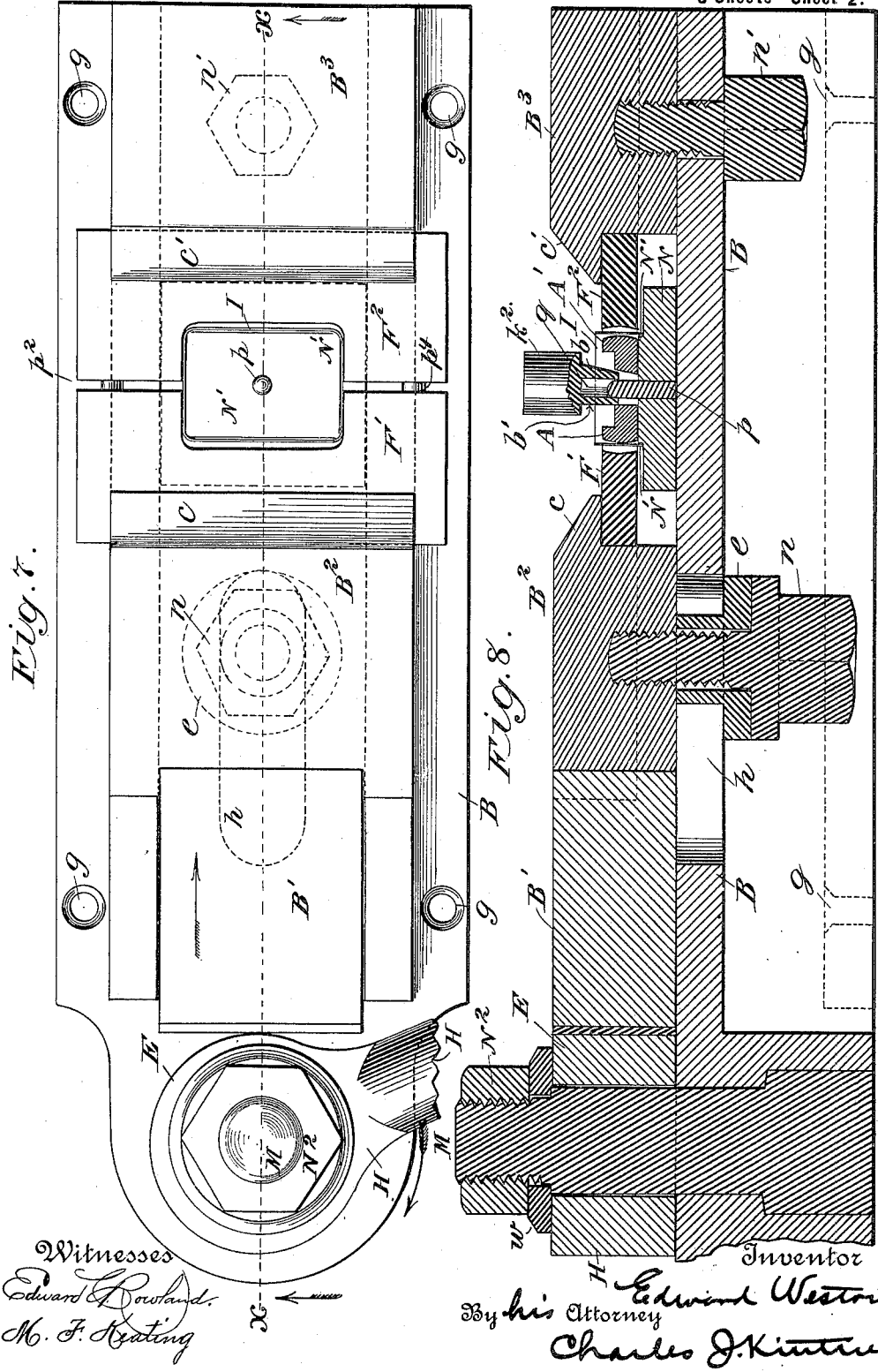

No. 678,707. Patented July 16, 1901.
E. WESTON.
ART OF MANUFACTURING MOVABLE COILS FOR USE IN CONNECTION WITH ELECTRICAL MEASURING INSTRUMENTS.
(Application filed Nov. 27, 1899.)
(No Model.) 3 Sheets—Sheet 3.
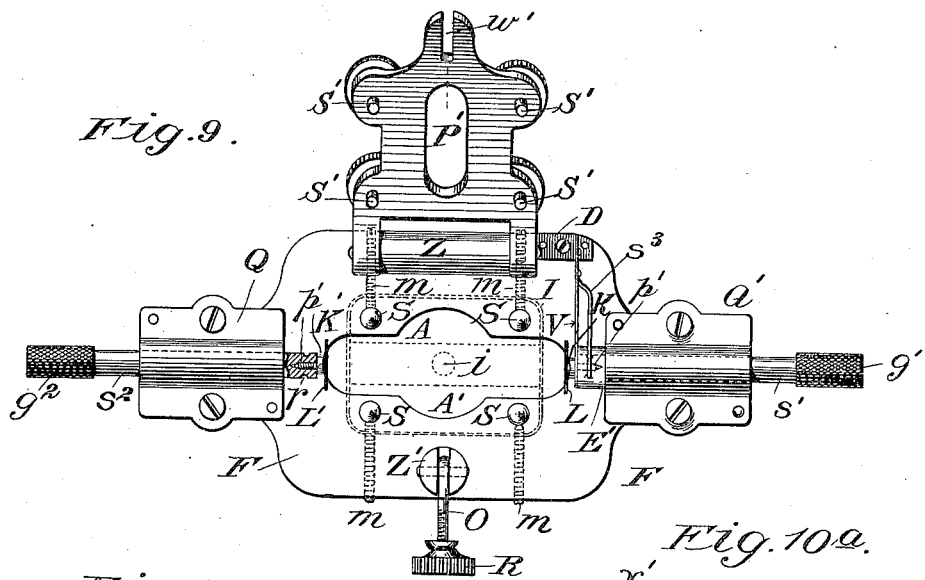
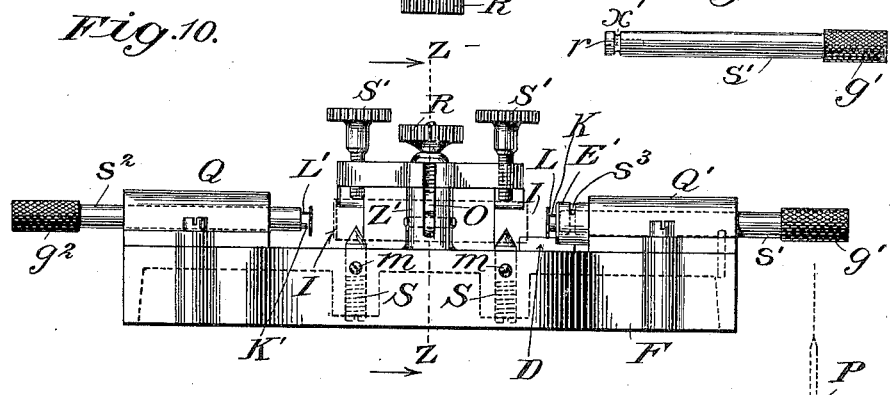
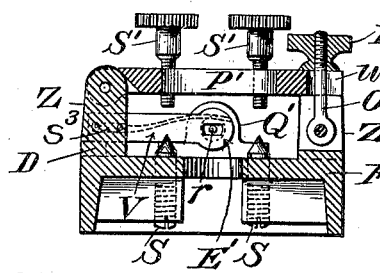
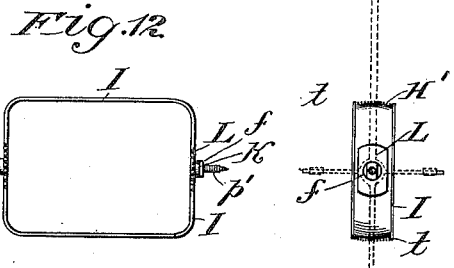
Witnesses
Edward C. Rowland
M. F. Keating
Inventor
Edward Weston
By his Attorney
Charles J. Kintner
THE NORRIS PETERS CO., PHOTO-LITHO., WASHINGTON, D. C.

UNITED STATES PATENT OFFICE.

EDWARD WESTON, OF NEWARK, NEW JERSEY.

ART OF MANUFACTURING MOVABLE COILS FOR USE IN CONNECTION WITH ELECTRICAL MEASURING INSTRUMENTS.

SPECIFICATION forming part of Letters Patent No. 678,707, dated July 16, 1901.

Application filed November 27, 1899. Serial No. 738,377. (No model.)

*To all whom it may concern:*

Be it known that I, EDWARD WESTON, a subject of the Queen of Great Britain, residing at Newark, in the county of Essex and State of New Jersey, have made a new and useful Invention in the Art of Manufacturing Movable Coils for Use in Connection with Electrical Measuring Instruments, of which the following is a specification.

My invention is directed particularly to a novel method of forming or constructing movable coils for electrical measuring instruments—such, for instance, as is shown in Fig. 2 of the drawings and described in the specification of United States Patent No. 611,722, granted to me on the 4th day of October, 1898; and it has for its objects, first, to construct a movable coil which shall be absolutely symmetrical in all of its parts and of the lightest practical available structure; second, to construct a supporting frame or spool for coils of this nature of a single piece of material without joint or seam and to simultaneously give to the lateral or side faces thereof a curvature which shall be mathematically concentric with the curvature of the field-magnet poles which inclose it, and, third, to so secure the pivots which support such coils when in use that they shall be located in the axial line of the completed coil and also that the needle-supporting pivot shall have a fixed relation to the coil, which will always render it certain that the index-needle carried thereby shall be in a plane passing through the mathematical center of the coil or in a plane having a definite or fixed relation thereto.

My invention will be fully understood by referring to the accompanying drawings, in which—

Figure 1 illustrates in elevational view a thin metallic tube, preferably of drawn aluminium, from which the supporting frames or spools of the coils are cut in sections, as shown in dotted lines, Fig. 2 being a perspective view of one of such sections. Fig. 3 is a perspective view of a rectangular-shaped forming-mandrel for giving to the supporting frame or spool the desired initial configuration, as shown in dotted lines. Fig. 4 is a plan view of the forming-frame and the sectional forming and supporting core with one of the supporting frames or spools in place between said parts, illustrating the method of the formation thereof, the lower end of said frame being shown in broken sectional view for the purpose of illustrating the separable nature of the two-part forming-frame, a burnishing-tool being also illustrated in perspective view as it is used in turning down the lateral edges of the supporting frame or spool. Fig. 5 is a plan view similar to Fig. 4, illustrating the method of completing the formation of the supporting frame or spool after the burnishing-tool has been utilized in turning down the lateral edges of the tube. Fig. 6 is a sectional view taken on the line $y\ y$, Fig. 4, and as seen looking thereat from the bottom toward the top of the drawings in the direction of the arrows, the burnishing-tool being omitted. Fig. 7 is a plan view of the mechanism or means for holding and manipulating the parts of the frame or spool-forming apparatus, the latter being shown in position with the parts of the forming-frame slightly separated. Fig. 8 is a longitudinal sectional view thereof taken on the line $x\ x$, Fig. 7, and as seen looking thereat from the bottom toward the top of the drawings in the direction of the arrows. Fig. 9 is a part plan, part perspective view of the apparatus for securing the pivots to the completed coil and in the axial line thereof and also for properly locating the shouldered pivot which supports the index-needle in such manner that the point of the latter will be in the central plane of the coil or in a plane bearing a definite relation to the axis thereof, the holding device for securing the frame in a definite or fixed position with relation to the axis of the pivot-supporting rods being shown in an open position, the completed coil with its sectional forming and supporting core being shown in dotted lines. Fig. 10 is a side elevational view of the same apparatus shown in Fig. 9, illustrating the holding device in a closed position and the supported coil in dotted lines. Fig. 10ª is a detail elevational view of that one of the pivot-supporting rods which aids in the securing of the needle-supporting pivot in proper position. Fig. 11 is a transverse sectional view taken through Fig. 10 on the line z z and as seen looking thereat from the left toward the right hand side of the drawings in the direction of the arrows. Fig. 12 is a side elevational view of the completed coil after the forming and supporting core has been removed. Fig. 13 is an end elevational view of the same as seen looking at Fig. 12 from the right toward the left hand side of the drawings, the index-needle being shown in position in this figure in dotted lines, the supported coil of a single layer of insulated wire being shown in sectional view.

In prior patents, Nos. 392,385 and 470,340, granted to me respectively on the 6th day of November, 1888, and 8th day of March, 1892, I have described and shown novel forms of movable coils for electrical measuring instruments and novel methods of and means for constructing the same, the former being constructed by first forming a coil of insulated wire upon a rectangular-shaped forming-mandrel, afterward removing the mandrel and placing about the coil a coating of electro deposited copper, the latter by winding an insulated coil in a number of layers around a mandrel and uniting the same together with shellac, afterward drying the completed coil and securing to the opposite sides thereof the pivot-pins. Such structures, however, are both open to the objection that in the handling or manipulating of the coils there is great danger of varying their symmetry, and there is also a further objection in that the dimensions of both of these forms of coils are such as to make it impractical to give to them a minimum cross-sectional area, a feature of great importance, as is disclosed in my Patent No. 611,722, above referred to.

My present invention is directed to a novel method of forming coils of a minimum weight, like that disclosed in the before-mentioned Patent No. 611,722 and centering the supporting-pivots thereof in such manner that they shall be located directly in the mathematical axis of the coil.

Referring now to the drawings in detail, T, Fig. 1, represents a thin drawn metallic tube, preferably of aluminium, from the end of which are cut successively short sections I, Fig. 2, of the desired length, each to constitute the supporting frame or spool for the coil when formed, as hereinafter described.

T′, Fig. 3, represents a rectangular-shaped forming-mandrel with rounded corners adapted to give to the short sections of tube I the proper initial configuration, as shown in dotted lines.

F′ and $F^2$ represent duplicate halves of a separable forming-frame detachably united together by pins $p^2 p^4$. Between the adjacent faces of this forming-frame is cut out a rectangular-shaped opening with rounded corners, the end faces of said opening being located in parallel planes, while the lateral faces thereof are curved, as shown in Fig. 6, to correspond to the curvature of the space between the field-magnet poles and the stationary soft-iron magnetizable cylinder, which constitutes the magnetic field of an electrical measuring instrument—such, for instance, as is shown in my Patent No. 611,722, above referred to.

A, A′, and $K^3$ constitute the three individual sectional parts of a forming and supporting core for the frame or spool, the opposite ends of said sectional parts being parallel with the corresponding inner ends of the separable forming-frame F′ $F^2$ and the outer lateral faces thereof so curved as to be concentric with the corresponding curved portions of said forming-frame F′ $F^2$. The inner face of the sectional part A is parallel with the outer face of the forming-frame F′, while the corresponding inner face of the sectional part A′ is in a plane located at an angle thereto, and the corresponding faces of the central sectional part $K^3$ are in similar planes, the arrangement being such that in the act of putting the parts together there is a wedge-like action, forcing aside the part A′. In a curvilinear recess in the upper surface of the sectional part $K^3$ is secured by screws $l l$ a disk $j$, the lateral edges of which are adapted to fit accurately in corresponding semicircular recesses in the upper faces of the sectional parts A A′ when in its lower position, the arrangement being such that when the parts are fitted together, as shown in Fig. 6, the upper surface of the disk $j$ is flush with the upper surfaces of the parts A A′ $K^3$.

$i$ is a hole or opening extending entirely through the central sectional part $K^3$ and disk $j$ and is located in the absolute mathematical center of the sectional core when the parts are grouped together in the manner shown in Figs. 4, 5, and 6.

$d\ d\ d\ d$ are four cone-shaped depressions drilled with mathematical nicety in the faces of the sectional parts A A′, the function of which will be described later in connection with the description of the method of centering the pivot-supports of the coil.

$b^4$, Figs. 4 and 5, is a burnishing-tool, the function of which will be described in connection with the description of the method of operation.

Referring now to Figs. 7 and 8, B represents the metallic base of the mechanism for holding and manipulating the parts of the frame or spool forming apparatus already described in connection with Figs. 4, 5, and 6 and illustrated in position in said base in plan view in Fig. 7 and in sectional view in Fig. 8, said base being secured to a bench or table by screws extending through screw-holes $g\ g\ g\ g$. $B^2$ and $B^3$ are metallic blocks provided with shoulders or ledges $c\ c′$, adapted to overlap the edges of the separable forming-frame F′ $F^2$, the block $B^3$ being held rigidly by a screw-bolt $n′$ and the block $B^2$ adjustably by a screw-bolt $n$ and washer $e$, having a neck extending upward through an oblong slot $h$ in the base B, the arrangement being such that it (the block) may be moved back and forth. E is an eccentric pivotally supported at one end of the base B by a bolt M, nut $N^2$, and washer $w$ and adapted to be rotated in the direction of the arrow by an operating-handle H. B' is a metallic block adapted to be removably located between the block $B^2$ and the eccentric E and to slide between guideways in the direction of the arrow when the eccentric is moved from left to right through the agency of the handle H, the right-hand end of the block B' resting normally against the sliding block $B^2$. N is a rectangular-shaped metallic block resting upon the base B and having on its upper surface a rectangular projection N' of substantially the same contour as the frame or spool I and the sectional forming and supporting core A A' $K^3$, the arrangement being such that when the frame or spool I is in position to be formed, as shown in Fig. 8, its lower edge will surround the upward projection N'. $p$ is a centering-pin in the center of the block N, its function being to enter the hole or opening $i$ of the sectional forming and supporting core, the arrangement of the parts being such that the axial center of the centering-pin is at equal distances from the curvilinear surfaces of the separable two-part forming-frame F' $F^2$ when the latter is in the closed position. (Shown in Figs. 4 and 5.) There may of course be any number of such pins and holes; but one of each is sufficient. $k^2$ is a wedging-tool adapted to be operated with a mallet or hammer and having at its lower end an oblong-shaped extension similar in general contour to the sectional part $K^3$, (illustrated in cross-section in Fig. 6,) but of somewhat smaller dimensions for first spreading the sectional parts of the forming and supporting core A A', as illustrated in Fig. 8, the face $b$ on one side corresponding to the similar face of the part A' and the face $b'$ to the similar face of the part A, $q$ being a centering hole or opening in said tool corresponding to the hole or opening $i$ in the central sectional part $K^3$. (Illustrated in Figs. 4 and 5.)

Referring now to Figs. 9 to 11, inclusive, I will describe the apparatus for the centering of the pivots which support the completed coil when in use in an instrument in such manner that they shall be located in the axial line of the coil and also for properly locating and securing the shouldered pivot which supports the index-needle in such manner that the point of the latter will be in the central plane of the coil or in a plane having a definite angular relation thereto. F is the supporting-frame of the apparatus, made, preferably, of cast metal, and S S S S are four screws extending upward through screw-holes in said frame, their upper ends being cone-shaped and adapted to fit with mathematical nicety in the corresponding cone-shaped depressions $d\ d\ d\ d$ of the sectional parts of the forming and supporting core. (Illustrated in Figs. 4 and 5.) $m\ m\ m\ m$ are set-screws running laterally through the sides of the frame and adapted to bear with their pointed inner ends against the lateral faces of the screws S S S S. $s'\ s^2$ are pivot-supporting rods, provided at their outer ends with milled rotating handles $g'\ g^2$, said rods being accurately journaled in journal-bearings Q' Q in the opposite ends of the frame, the arrangement being such that their axial lines when extended coincide. The inner ends of the pivot-supporting rods $s'\ s^2$ are provided with screw-threaded holes $r$, adapted to receive the screw-threaded pins $p'\ p'$, to which are attached the pivot-supporting plates L L', the arrangement of said parts being such that the rods $s'\ s^2$ may be moved inward and outward and rotated at will for a purpose to be hereinafter described. P' is a holding device for locking or holding the completed coil and its supporting-frame in a definite position with relation to the axial lines of the pivot-supporting rods $s'\ s^2$. Said holding device is pivotally supported at one side of the frame upon a lug or extension Z and is provided with four downwardly-extending screws S' S' S' S', located when in locked position directly above the cone-points of the four screws S S S S, as clearly shown in Fig. 11 of the drawings. $w'$ is a slot in the outer or free end of the holding device, adapted to receive one end of a locking-link O, pivotally supported upon a lug or extension Z' integral with the frame F, said locking-link O being provided at its upper end with screw-threads and a nut R for securing it firmly in position. E' is a metallic sleeve adapted to slide over the inner end of the pivot-supporting rod $s'$ and having secured to its inner end a laterally-extending arm V, provided with a rectangular slot in alinement with the axis of said rod for receiving the lateral faces $f\ f$ of the needle-supporting pivot K, Figs. 11, 12, and 13. The sleeve E' is provided with a slot on one side located, when in the position shown in Fig. 10, in alinement with the corresponding slot $x'$, Fig. $10^a$, and at the inner end of the pivot-supporting rod $s'$ when the latter is in the position shown in Fig. 9, the function of said slots being to receive the free end of a locking-spring $s^3$, secured to the outer end of the arm V. D is a metallic block secured to the frame F and adapted to sustain the free end of the arm V when rotated into the position shown in Fig. 11, the function of this part of the apparatus being to so locate that pivot-point which supports the index-needle P that the latter will be in the axial plane of the coil, as clearly illustrated in dotted lines in Fig. 13, or at any predetermined angle, as may be desired.

Referring now to Figs. 1 to 8, inclusive, I will describe first the method of operation in manufacturing the supporting frame or spool. The short lengths of tubing which are to constitute the frames or spools I are cut from the tube T and afterward annealed, in any preferred manner, to the desired hardness for the purpose of preventing cracking or rupturing of the edges when the latter are turned down with the burnishing-tool so as to constitute the side flanges. These short sections of tubing are then placed upon the forming-mandrel T' and forced thereover to a definite point, as indicated in dotted lines, Fig. 3, so as to give to them the proper initial rectangular configuration. The block B', Figs. 7 and 8, is removed and the adjustable block B² moved a sufficient distance to the left to permit of the insertion of the separable forming-frame F' F² in position, with the parts separated, as shown in Fig. 7. The rectangular frame or spool I is now placed in position upon the block N, around the projection N', and the two sectional parts A and A' of the forming and supporting core inserted, as shown in Fig. 8. The wedging-tool $k^2$ is then inserted, with the faces $b$ and $b'$ resting against the corresponding faces of the sectional parts A A' of the forming and supporting core and with the pin $p$ entering the centering hole or opening $q$. The tool is driven downward with a mallet or hammer, thus causing the sectional part A' to be forced to the right against the inner right-hand face of the frame or spool I, the sectional part A remaining stationary, inasmuch as the pin $p$ prevents any lateral movement thereof. The block B' is then put in place between the eccentric E and the adjustable block B² and the eccentric rotated from left to right in the direction of the arrow through the agency of the handle H, thus causing the adjustable block B² to firmly force the parts of the separable forming-frame F' F² together and give to the frame or spool I a curvilinear shape. The tool $k^2$ is then removed and the sectional part K³ inserted and driven firmly home with a mallet or hammer until the disk $j$ is flush with the surfaces of the parts A and A', as clearly shown in Fig. 6 of the drawings, thus completing the curvilinear formation of the supporting frame or spool and leaving the lateral edges $t\ t'$ thereof projecting at equal distances upon opposite sides of the frame, as clearly shown in Figs. 4 and 6 of the drawings. The burnishing-tool $b^4$ is now applied, as shown in Fig. 4, and the upper edge $t$ is turned outward by the application of said tool, so as to constitute a flange, as clearly shown in Fig. 5 and in dotted lines in Fig. 6. The eccentric E is now rotated in a reverse direction, the block B' removed, and the adjustable block B² withdrawn a sufficient distance to permit the forming-frame F' F² to be withdrawn and reversed, after which the block B' is restored and the eccentric again rotated from left to right, causing the adjustable block B² to restore the pressure upon the forming-frame and the inclosed supporting frame or spool. The burnishing-tool is then applied to the projecting edge $t'$ and the same is turned down, so as to constitute the other flange, as clearly shown in dotted lines, Fig. 6 of the drawings. The block B' is then removed and the adjustable block B² withdrawn, after which the parts of the forming-frame are separated a sufficient distance to permit of the removal of the completed supporting frame or spool and its forming and supporting core. The outer edges of the flanges $t\ t'$ are now trimmed upon a trimming-machine, which leaves upon the sides and ends flanges of the desired depth, such trimming device being so adjusted as to always leave like flanges for coils designed for a special type of instrument. The completed supporting frame or spool and its forming and supporting core are now placed upon a lathe, with the rotary part thereof extending through the centering hole or opening $i$ and the coil of insulated wire H' is accurately wound thereon, preferably in a single layer, as clearly shown in Fig. 13 of the drawings. I am enabled by this method to construct a supporting frame or spool for the movable coil of an electrical measuring instrument which shall be mathematically symmetrical in all of its parts, and by reason of the fact that the forming and supporting core is left in position until after the coil is wound thereon there is no danger of varying the symmetry thereof. Furthermore, the insulated wire may be wound thereon under a tension which would not be possible in the use of delicate frames or spools like those herein described. This method also makes it possible for me to place upon such supporting frames or spools absolutely the same amount of wire for a given number of turns, thereby assuring such a structure that the movable coils of all similar instruments shall be the exact duplicates of each other.

Referring now to Figs. 9 to 13, inclusive, I will describe my novel method of permanently securing the coil-supporting pivot-pins to the ends of the completed coil in such manner that their axes shall be mathematically in alinement with each other and coincident with the mathematical axis of the coil itself. In the construction of the apparatus illustrated in Fig. 9 it will be understood that the axial lines of the pivot-supporting rods $s'\ s^2$ are coincident with each other and pass through a line midway between the points of the screws S S S S, and that said screws are so adjusted in the frame F that said axial line will be in the mathematical center of the forming and supporting core when the latter is placed thereon, with the points of the screws extending upward into the depressions $d\ d\ d\ d$, (see Figs. 4 and 5,) and that after said adjustment is effected said screws are firmly secured by the set-screws $m\ m\ m\ m$, so that their positions when once determined shall be constant. It will also be understood that when the forming and supporting core is in position and the holding device P' in its lower or locked position the points of the screws S' S' S' S' are in a plane parallel with the plane passing through the extreme points of the screws S S S S and adapted to bear all firmly upon the upper surface of the forming and supporting core. In other words, the points of the coned screws when properly adjusted are all in a common plane and support the forming and supporting core with a definite or fixed relation to the axes of the pivot-supporting rods $s'$ $s^2$, and the screws $S'$ $S''$ $S'$ $S'$ and locking-link O, with locking-nut R, will, when secured in the manner shown in Fig. 10, maintain or hold said parts in a definite relation to the forming and supporting core and the frame or spool and coil carried thereby. The pivot-supporting plate L' and lower pivot-pin K' are now detachably secured to the inner end of the pivot-supporting rod by means of the screw-threads $p'$, after which the inner surface of said plate is covered with a definite amount of cement and the pivot-supporting rod $s^2$ is rotated in such direction as will bring the lateral edges of the plate L' parallel with the end flanges of the supporting frame or spool I. The rod $s^2$ is then forced continuously inward from left to right until the plate L' is held firmly against the face of the coil H', thereby cementing the pivot to the coil and its supporting frame or spool I. The needle-supporting pivot K requires a more accurate adjustment in order that the lateral faces $ff$ may bear a fixed relation to the frame or spool and its supported coil. To effect this, said pin is inserted in the rectangular slot or opening in the inner end of the sleeve E', said faces being absolutely parallel with the lateral faces of the arm V. The sleeve E', with its supported pivot-pin and plate L, is now placed in position, with the pivot-pin in alinement with the screw-hole $r$ in the inner end of the supporting-rod $s'$, and the latter is rotated from left to right until the locking-spring $s^3$, the free end of which rests in the slot of the sleeve E', falls into the concentric slot $x'$, thereby locking the parts together. When this occurs and the parts are securely held together by the screw-threads $p'$ of the pin and the corresponding screw-threads at the inner end of said rod, the upper end of the arm V rests upon the upper surface of the block D, which is of such a thickness that when said arm is in this position the lateral faces $ff$ of the pivot-pin K are absolutely parallel with the lateral edges of the supporting frame or spool I. (See Figs. 11 and 13.) The inner surface of the plate L is then coated with cement and the pivot-supporting rod $s'$ forced longitudinally inward from right to left until the plate L is held firmly against the face of the coil H', thereby securing the pivot to the coil and its supporting frame or spool I. The completed coil is left in this position until the cement is thoroughly dry. The sectional supporting-core is not removed until it becomes necessary to place the coil in position in a completed instrument, said core acting as a means of maintaining it, the coil, and its supporting frame or spool I in perfect condition without danger of being injured. When the coil is required for use, the pivot-supporting rods are detached by rotating them in the proper direction and the sectional supporting-core is removed. The coil is then immediately put in position in the instrument for which it is designed.

Although I have shown and described the frame or spool and supported coil as of rectangular form, it is obvious that it may be of any desired form, as circular, triangular, or, in fact, such form as the shape of the field-magnets, between or before which it is designed to rotate, may necessitate.

I do not limit myself to the especial means hereinbefore described and illustrated in the accompanying drawings for effecting or practicing the method of making a supporting frame or spool for the movable coil of an electrical measuring instrument, nor to the means hereinbefore described and illustrated in the accompanying drawings for so centering the supporting-pivots thereof that their axes shall be in absolute alinement with each other and coincident with the mathematical axis of the supported coil, and that the index-needle shall be in the central plane of its supporting coil and frame or in a plane having a definite relation thereto, as the methods of operation hereinbefore described and hereinafter claimed are generic and may be effected by any means which will produce the accurate results sought and attained. Nor do I make any claim in the present application to the means herein described for effecting the methods practiced in the use of such said means, as the same is made the subject-matter of a separate application filed in the United States Patent Office on the 18th day of December, 1899, and bearing Serial No. 740,843. Nor do I claim in the present application an article of manufacture consisting of a frame or spool and a coil wound thereon, said parts being supported by a detachable or removable core. Nor do I claim herein an article of manufacture consisting of a frame or spool, a coil wound thereon, and one or more pivot-pins secured thereto, together with a detachable or removable core supporting all of said parts, as this subject-matter is embodied in a separate or divisional application filed by me in the United States Patent Office on the 3d day of June, 1901, and serially numbered 62,833.

Having thus described my invention, what I claim, and desire to secure by Letters Patent of the United States, is—

1. The described method of manufacturing a symmetrical removable coil for an electrical measuring instrument, consisting in first forming a supporting frame or spool by subjecting a short tube of metal to pressure until the desired conformation and shape are obtained, then winding the coil thereon and finally securing the pivot-pins thereto in the axial line of the coil.

2. The described method of manufacturing a movable coil for an electrical measuring instrument, consisting in first forming a supporting frame or spool of a single piece of metal by subjecting the same to pressure until the desired conformation and shape are obtained, winding the coil thereon and then securing the pivot-pins thereto in the axial line of the coil and simultaneously adjusting the needle-supporting pivot in such manner that the point of the needle is located in the central plane of the coil, or in a plane at a definite angle thereto.

3. The described method of securing the pivot-pins to the movable coil for an electrical measuring instrument in the mathematical axial line thereof, consisting in securing or locking the coil in a definite or fixed position and then detachably securing the pivot-pins to movable supports which have a fixed relation to the mathematical axis of the supported coil; coating the pivot-supporting plates with cement, moving the same into mechanical connection with the coil and its supporting frame or spool and allowing the parts as thus secured to so remain until the cement sets or hardens.

4. The described method of securing the needle-supporting pivot to the movable coil of an electrical measuring instrument and in such manner that the point of the needle shall lie in the central plane of the coil, consisting in securing or locking the coil in a definite or fixed position and then detachably securing the needle-supporting pivot in a movable support which has a fixed relation to the mathematical axis of the supported coil; coating the pivot-supporting plate with a cement, rotating said pin until the rectangular faces thereof are in planes parallel with the central plane of the coil, and finally moving the plate into mechanical connection with the coil and allowing it thus to remain until the cement sets or hardens.

5. The described method of securing the pivot-pins to the movable coil for an electrical measuring instrument in the mathematical axial line thereof, consisting in securing or locking the coil in a definite or fixed position and then detachably securing the pivot-pins to movable supports which have a fixed or definite relation to the mathematical axis of the supported coil, and finally moving the supported pivot-pins into mechanical contact with the coil and permanently securing them thereto.

6. The described method of securing the needle-supporting pivot to the movable coil of an electrical measuring instrument and in such manner that the point of the needle shall lie in the central plane of the coil, consisting in securing or locking the coil in a definite or fixed position and then detachably securing the needle-supporting pivot-pin in a movable support which has a definite or fixed relation to the mathematical axis of the supported coil; rotating said pin until the rectangular faces thereof are in planes parallel with the central plane of the coil, then moving the same forward and connecting it to the coil.

7. The described method of securing the needle-supporting pivot to the movable coil of an electrical measuring instrument in such manner that the point of the needle shall have a definite or fixed relation to the axis of the coil, consisting in securing or locking the coil in a definite or fixed position and then detachably securing the needle-supporting pivot to a movable support which has a definite or fixed relation to the mathematical axis of the supported coil, then rotating the pivot to a definite point and finally securing it permanently to the coil.

In testimony whereof I have hereunto subscribed my name this 22d day of November, 1899.

EDWARD WESTON.

Witnesses:
C. J. KINTNER,
W. H. MOORE.